United States Patent Office.

H. N. KIMBALL, OF WATERTWN, NEW YORK.

Letters Patent No. 67,557, dated August 6, 1867.

---

IMPROVEMENT IN BANDAGE FOR CHEESE.

---

*The Schedule referred to in these Letters Patent and making part of the same.*

---

TO WHOM IT MAY CONCERN:

Be it known that I, H. N. KIMBALL, of Watertown, in the county of Jefferson, and State of New York, have invented certain new and useful Improvements in Cheese-Bandages; and I hereby declare the following to be a full, clear, and exact description of the same.

In the manufacture of cheese, the ordinary bandages used in factories for binding and holding in shape the cheese, as well as protecting it from injury, are made of cotton or some other textile fabric. There are disadvantages, however, attending the use of these bandages which greatly detract from their utility. The cotton or other cloth is apt to stretch, thus allowing the cheese to sway and become misshapen, so that its edges get bent and thrown out of proper form. This is more noticeable in rolls of large size, where the cheese is very often seen to bulge or project out beyond the proper line. Another defect, and one which is a source of much trouble and vexation to consumers as well as manufacturers of cheese, is that the open or loose texture of the cloth permits flies to deposit their eggs under the bandage and in the cheese. The grubs or maggots which in process of time are hatched from these eggs of course run through the cheese and detract greatly from its value.

The object of my invention is to produce a bandage which shall possess none of these defects, and after considerable investigation I have found that the use of paper as a substitute for the cloth is followed by the best results. As it is less elastic and yielding than the cotton cloth, while in this particular connection it is quite strong enough for all practical purposes, it holds the cheese in perfect shape, preventing it from becoming "lop-sided" or misshapen, and keeping the edges straight. The closeness of the texture or fibre of the paper also prevents the fly from depositing her eggs in the cheese, thus effectually protecting the latter from being injured by the fly-maggot. Another advantage resulting from the use of the paper is its comparative cheapness. Its cost is not so great as that of the cloth bandage, while it is not any more liable to become injured or torn, and is in all respects as durable as the latter. The kind of paper I have found best adapted to my purpose is what is commonly known as "manilla paper," but, while I prefer this paper on the whole, other kinds of paper, provided they be of sufficient strength and have a close texture, can be employed with perhaps quite as good results. The paper bandage is applied to the cheese in the usual manner, and is manipulated and used in every respect like an ordinary cloth bandage. It completely encircles or covers the cheese, and is not used as accessory to but as a substitute for the cloth bandage.

Having described my invention, and the manner in which the same is or may be carried into effect, what I claim, and desire to secure by Letters Patent, is—

The application and use of paper as a bandage in the manufacture of cheese, substantially as herein specified.

In testimony whereof I have signed my name to this specification before two subscribing witnesses.

H. N. KIMBALL.

Witnesses:
    J. H. CAMP,
    M. THOMPSON.